Dec. 4, 1962 C. A. BRAUCHLER 3,066,403
METHOD OF MAKING EXTRUDED TUBES FROM POWDERED METAL
Filed Nov. 6, 1959 4 Sheets-Sheet 1

INVENTOR.
Charles A. Brauchler
BY
Frease, Bishop, Johns & Schick
ATTORNEYS

Dec. 4, 1962 C. A. BRAUCHLER 3,066,403
METHOD OF MAKING EXTRUDED TUBES FROM POWDERED METAL
Filed Nov. 6, 1959 4 Sheets-Sheet 2
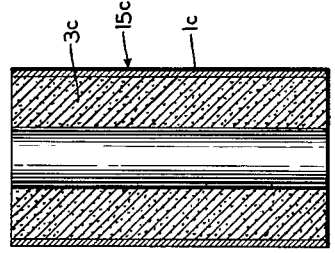
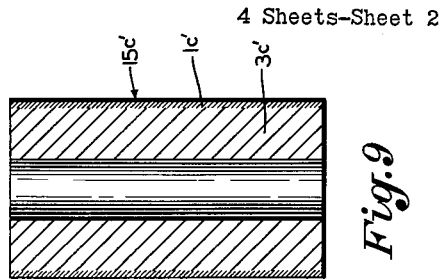
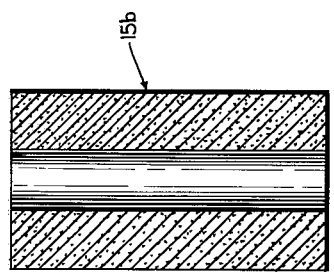
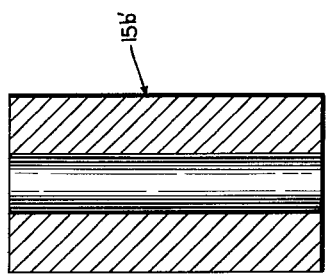
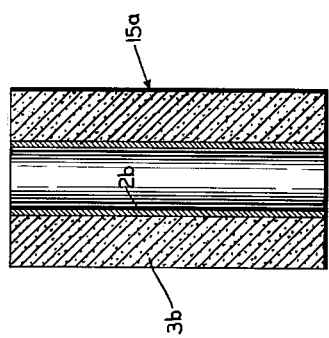
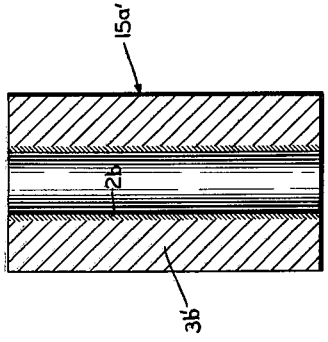
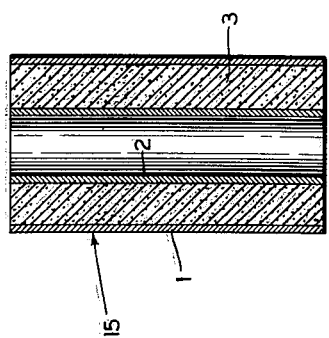
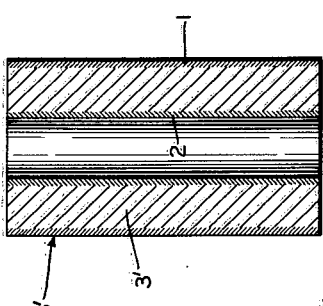
INVENTOR.
*Charles A. Brauchler*
BY
*Frease, Bishop, Johns & Schick*
ATTORNEYS Dec. 4, 1962 C. A. BRAUCHLER 3,066,403
METHOD OF MAKING EXTRUDED TUBES FROM POWDERED METAL
Filed Nov. 6, 1959 4 Sheets-Sheet 3

INVENTOR.
Charles A. Brauchler
BY
Frease, Bishop, Johns & Schick
ATTORNEYS

Dec. 4, 1962     C. A. BRAUCHLER     3,066,403
METHOD OF MAKING EXTRUDED TUBES FROM POWDERED METAL
Filed Nov. 6, 1959     4 Sheets-Sheet 4

INVENTOR.
Charles A. Brauchler
BY
Frease, Bishop, Johns & Schick
ATTORNEYS 3,066,403
METHOD OF MAKING EXTRUDED TUBES FROM POWDERED METAL
Charles A. Brauchler, % The Canton Drop Forging & Mfg. Co., Canton, Ohio
Filed Nov. 6, 1959, Ser. No. 851,292
2 Claims. (Cl. 29—420.5)

The invention relates to extruded tubes or pipes made of powdered metal and more particularly to the manufacture of such extruded tubes in which one or more layers thereof may be formed of seamless hollow cylinders of stainless steel or other alloy or metal with compacted powdered iron alloy or other metal located therebetween or adhering thereto.

It is known that bi-metal tubing has been extruded from soft metals such as copper, tin and lead, by forming a blank of one metal and applying a coating of another metal thereto, as by dipping, or by forming a hollow blank of one metal and placing a hollow blank of another metal therein.

Such metals, however, have never before been used in the extrusion of relatively hard metals such as steel, stainless steel, or other alloy steels, iron and the like, and such hard metals could not be integrally bonded together by such prior methods.

Insofar as I know, no one has, prior to my invention, formed extruded tubing or pipe from powdered iron, alloys, and the like, either alone or in combination with hollow cylinders of stainless steel or other alloy steels, or the like.

I have found that tubing containing iron, stainless steel, or other alloy steels, and the like may be very satisfactorily extruded from blanks formed of or containing powdered iron, alloys or similar metals, and bi-metal or tri-metal tubes may be extruded from blanks comprising one or more spaced concentric hollow cylinders of stainless steel, other alloy steels or the like, with powdered iron, alloys or the like compacted therebetween or associated therewith.

It is therefore a primary object of the invention to form extruded metal tubing from a hollow cylindrical blank formed of or containing compacted powdered iron, alloys or the like.

Another object of the invention is to provide a method of making bi-metal or tri-metal tubing formed from a blank comprising one or more spaced, concentric tubes of stainless steel, other alloy steels or the like, with powdered iron, alloys or the like compacted therebetween or associated therewith, the layers of such bi-metal or tri-metal tubing being bonded together.

A further object of the invention is to provide a method of making extruded tubing which comprises the formation of a hollow cylindrical blank formed of, or containing powdered iron, alloys or the like, compacting the powdered metal under extreme pressure, sintering the compacted blank and extruding the same to form extruded dense metal tubing.

A still further object of the invention is to provide a method of forming tri-metal tubing which consists in compacting powdered iron, alloys or the like, between two spaced, concentric cylinders of stainless steel, other alloy steel or the like, sintering the powdered metal and extruding the blank at sufficient temperature to form tri-metal tubing having inner and outer layers of stainless steel, other alloy steel or the like, with an intermediate dense layer of iron, alloys or the like bonded thereto.

It is also an object of the invention to provide a method of making extruded bi-metal tubing which consists in compacting a hollow cylinder of powdered iron, alloy or the like upon the interior or exterior of a hollow cylinder of stainless steel, other alloy steel or the like, sintering the compacted powdered metal and extruding the blank under sufficient temperature to form bi-metal tubing containing an inner or outer layer of stainless steel, other alloy steel or the like with a layer of iron, alloy or the like bonded to the interior or exterior surfaces thereof.

The above objects together with others which will be apparent from the drawings and following description, or which may be later referred to, may be attained by carrying out the method of making extruded metal tubes in the manner hereinafter set forth in detail and illustrated in the accompanying drawings.

The invention may be stated in general terms as comprising a method which consists in forming a hollow cylindrical blank from, or containing, powdered iron, alloys or the like, compacting the powdered metal under extreme pressure within a container, sintering the compacted powdered metal blank and extruding the same to form extruded dense metal tubing.

In the formation of tri-metal tubing, a hollow cylinder of stainless steel, other alloy steel or the like, is mounted within a container in contact with the inner walls thereof, and a second hollow cylinder of stainless steel, other alloy steel or the like, of smaller diameter, is located in the container, concentrically with and spaced inwardly from the first-mentioned hollow cylinder, the interior of said second hollow cylinder being supported by a mandrel inserted into the container.

Powdered iron, alloys or other metal is then placed in the container between the hollow cylinder of stainless steel, or the like, and the powdered metal is compacted by a ram operated at a pressure of about 255,000 pounds per square inch to form a dense layer of the powdered metal between the stainless steel cylinders.

The compacted powdered metal is then sintered at a sufficient temperature to cause the same to bond together and to adjacent surfaces of the stainless steel cylinders, and the hollow cylindrical blank thus formed is then placed in an extrusion press and extruded under heat and pressure to form tri-metal tubing having inner and outer layers of stainless steel or the like with a dense intermediate layer of iron or the like bonded thereto.

Under the invention, bi-metal tubing may be formed having an inner layer of stainless steel or the like and an outer layer of iron or the like bonded thereto, or an outer layer of stainless steel or the like and an inner layer of iron or the like bonded thereto.

In carrying out the invention to form a bi-metal tube having an outer layer of stainless steel or the like and an inner layer of iron or the like, a hollow cylinder of stainless steel or the like may be placed in the container and the space between the same and the mandrel of the container is filled with powdered iron, alloy or the like which is compacted under extreme pressure.

The blank thus formed may be removed from the container and sintered, and the hot blank placed in an extrusion press and extruded to form bi-metal tubing having an outer layer of stainless steel or the like and an inner dense layer of iron or the like bonded thereto.

As an alternative, a hollow cylinder of stainless steel or the like may be placed in the container, surrounding the mandrel therein, and the space between the same and the inner walls of the container is filled with powdered iron, alloy or the like and compacted under extreme pressure.

The blank thus formed is then removed from the container and sintered, and the hot blank is then placed in an extrusion press and bi-metal tubing is extruded therefrom, comprising an inner layer of stainless steel or the like and an outer dense layer of iron or the like bonded thereto.

In all of the forms of the invention, the powdered iron or other metal may be compacted by partially filling the container with the powdered metal and then compacting the same under pressure, and then, by additional steps, adding additional powdered metal and compacting the same under pressure until the entire space in the container has been filled with compacted powdered metal.

Having thus briefly described the invention, reference is now made to the accompanying drawings, in which:

FIG. 1 is a longitudinal sectional view through a container provided with a central back-up mandrel and a power-operated ram, showing a hollow, cylindrical tri-metal blank formed therein comprising spaced, concentric inner and outer hollow cylinders of stainless steel, other alloy steel or the like, the spaces therebetween being filled with compacted powdered iron, alloy or the like;

FIG. 2 is a longitudinal sectional view through a tri-metal blank as formed in the apparatus of FIG. 1;

FIG. 3 is a longitudinal sectional view through a hollow cylindrical bi-metal blank formed in this manner, comprising an inner hollow cylinder of stainless steel or the like surrounded by a hollow cylinder of compacted powdered metal;

FIG. 4 is a similar view showing a hollow cylindrical blank formed solely of compacted powdered metal;

FIG. 5 is a similar view showing a bi-metal blank comprising an outer cylinder of stainless steel or the like with a hollow cylinder of compacted powdered iron or the like upon the interior thereof;

FIG. 6 is a longitudinal sectional view through the tri-metal blank of FIG. 2 after the same has been sintered;

FIG. 7 is a similar view showing the bi-metal blank of FIG. 3 after the same has been sintered;

FIG. 8 is a similar view of the compacted powdered metal blank of FIG. 4 after the same has been sintered;

FIG. 9 is a similar view of the bi-metal blank of FIG. 5 after the same has been sintered;

Figure 1:
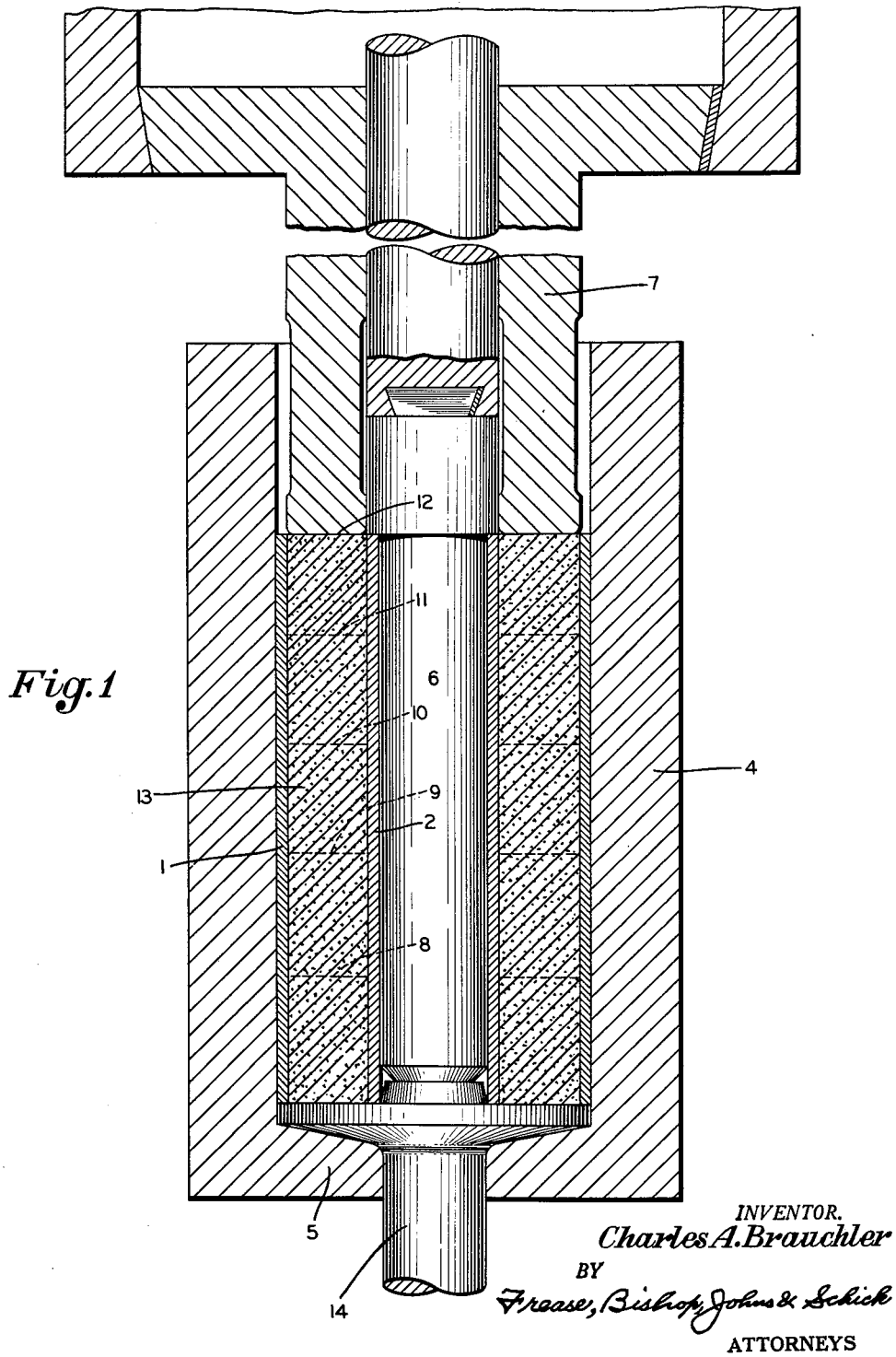

Referring now more particularly to the embodiments of the invention illustrated in the drawings, in which similar numerals refer to similar parts throughout, in FIG. 2 is shown a hollow, cylindrical, tri-metal blank comprising an outer layer 1 of stainless steel, other alloy steel or the like, an inner layer 2, which may be formed of the same or other desired metals, and an intermediate layer 3, of powdered iron, alloy or the like which has been compacted under extreme pressure so that it will be retained between the inner and outer layers 1 and 2, permitting handling or moving of the blank thus formed.

This blank may be formed in a press such as shown in FIG. 1, comprising a container having heavy cylindrical side walls 4 and a bottom wall 5, the upper end of the container being open. A vertically movable mandrel 6, operable by mechanism in the press (not shown) is inserted into the container 4 and a hollow cylinder 2 of stainless steel, other alloy steel or the like, is placed in the container surrounding said mandrel.

A hollow cylinder 1 of stainless steel, other alloy steel or the like, is placed within the container, in substantial contact with the cylindrical side walls 4 thereof. Powdered iron, alloy or other metal, is placed in the space between the stainless steel cylinders 1 and 2 and compacted by means of the ram 7, under a pressure of about 255,000 pounds per square inch, so as to compact the powdered metal into a dense layer between the stainless steel cylinders 1 and 2.

This compacting of the powdered metal is preferably performed in a plurality of operations, the space between the stainless steel cylinders 1 and 2 being first partially filled with the powdered metal, after which the ram 7 is operated to compact the same.

As an example, in the first operation, the powdered metal is compacted to the level indicated at 8. Additional powdered metal is then placed upon the top of the compacted metal and the ram again operated to compress the same to the level indicated at 9.

This operation is repeated compacting the powdered metal in additional stages to the levels indicated at 10, 11 and 12, at which time the space between the stainless steel cylinders 1 and 2 is substantially filled with a dense compact layer of powdered metal indicated generally at 13.

The ram 7 is then withdrawn from the container, and the mandrel 6, which operates independently of the ram, is also withdrawn from the container. The knock-out device 14 is then operated to remove the hollow cylindrical tri-metal blank 15 from the container, as shown in FIG. 2.

The blank 15 is then sintered at a suitable temperature to convert the layer 3 of powdered metal into a dense, homogeneous mass of iron or the like, indicated at 3' in FIG. 6, which shows the sintered blank, indicated generally at 15', comprising outer and inner layers 1 and 2 of stainless steel, other alloy steel or the like, with a dense, homogeneous layer 3' of iron, or the like, bonded to the adjacent surfaces thereof.

Figures 10, 11:
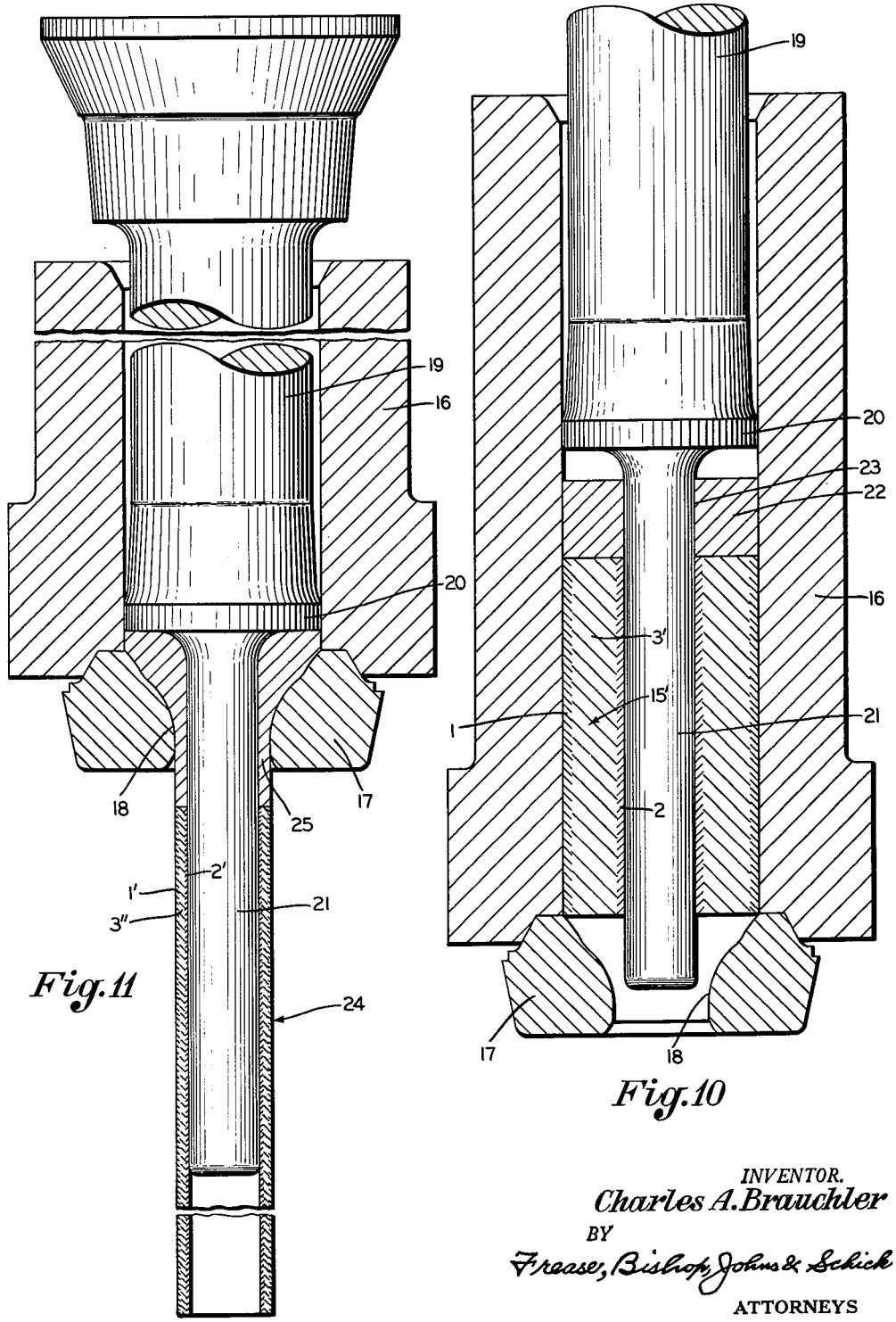
FIG. 10 is a longitudinal sectional view showing a portion of a press equipped with an extrusion die, with the tri-metal blank of FIG. 6 located therein, showing the press ram and mandrel in position preparatory to extruding tri-metal tubing therefrom.
FIG. 11 is a similar view showing the ram and mandrel at the end of the extrusion operation and showing the tri-metal tubing extruded therefrom.

In order to form extruded tri-metal tubing from the blank 15' of FIG. 6, this hot blank is then placed in the extrusion press shown in FIG. 10. This apparatus forms part of a hydraulic press or the like and includes the container 16, which may be of elongated cylindrical form having the extrusion die 17 at its lower or outer end.

The die opening 18 is shaped to produce the desired exterior size and contour of the extruded multi-metal tubing. The ram 19 of the press has a mandrel holder 20 attached to its lower or outer end, to which is connected the elongated mandrel 21, the exterior of which is shaped to form the desired size and contour for the interior of the extruded multi-metal tubing.

The hollow, tri-metal blank 15' of FIG. 6 is heated in the sintering operation to proper extrusion temperature, which of course will vary depending upon the metals of which the blank is formed. As an example for certain metals, this temperature may be from 2000° F. to 2200° F., although higher or lower temperatures may be required for other metals.

The hot blank is placed in the extrusion press as shown in FIG. 10. If desired, a hollow dummy block 22 may be placed on top of the blank 15' as shown in FIG. 10. This dummy block has a central opening 23 of such size and shape that the mandrel 21 may have a sliding fit therethrough.

The ram 19 is then lowered, inserting the mandrel 21 through the opening of the dummy block and through the central opening of the heated tri-metal blank 15', as shown in FIG. 10.

As the ram continues to advance under pressure the hot tri-metal blank will be extruded through the die opening 18, forming the tri-metal tubing 24 having the relatively thin outer and inner walls 1' and 2' respectively of stainless steel, other alloy steel or the like, and the relatively thick, dense, homogeneous layer 3" of iron, alloy or the like, bonded thereto, as shown in FIGS. 1 and 2.

At the end of the stroke of the ram, as shown in FIG. 11, the entire tri-metal blank will have been extruded through the die opening 18 and the dummy block 22 will have been partially extruded through the die opening, as indicated at 25, thus ejecting the entire blank from the die in the form of the extruded tri-metal tube 24.

The extruded tubing is then removed from the mandrel and the ram is retracted, after which the partially extruded dummy block is removed from the interior of the container, and a new dummy block may be provided for the next extrusion operation.

Figures 12, 13, 14, 15:
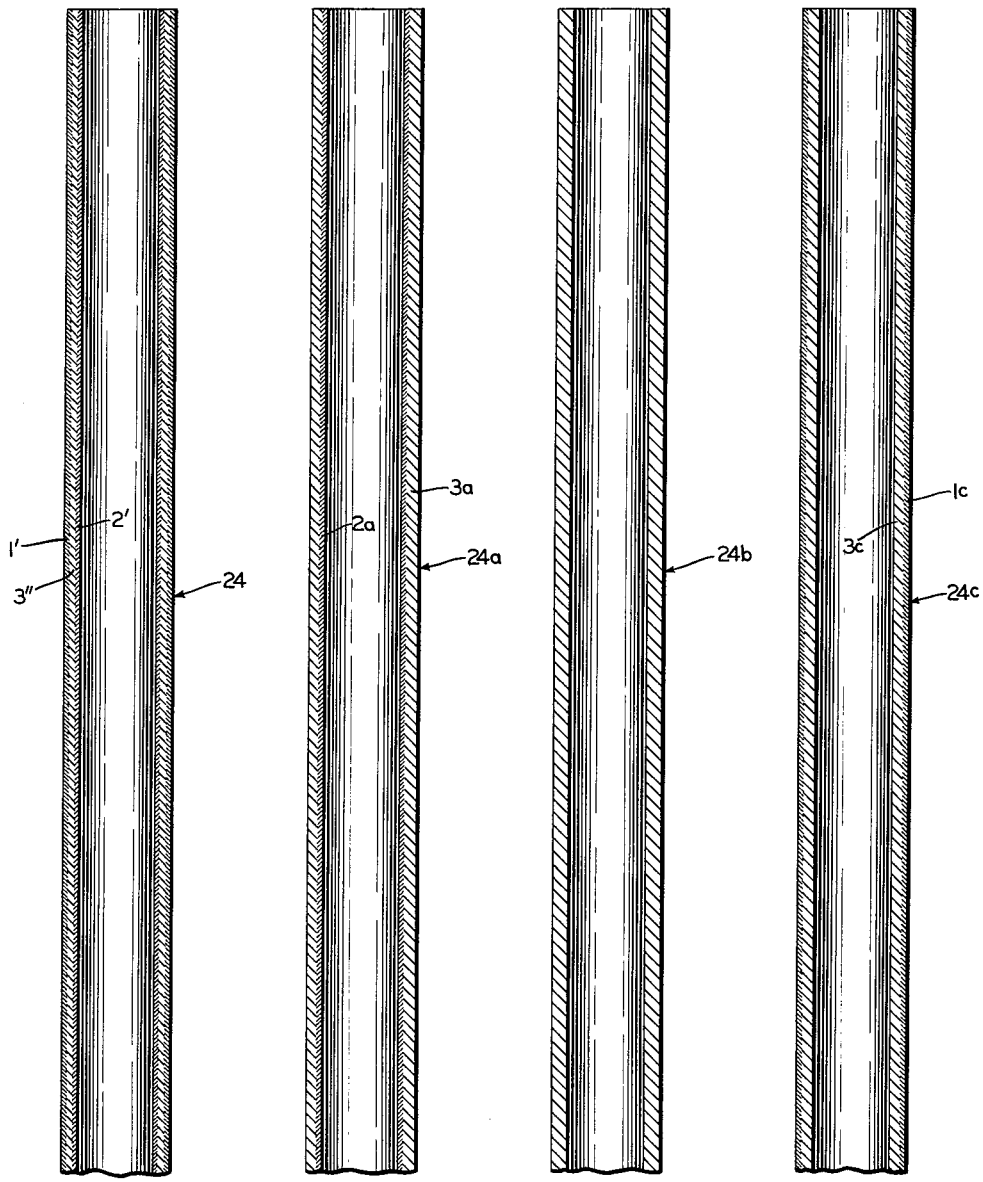
FIG. 12 is a longitudinal sectional view through tri-metal tubing as extruded in FIG. 11.
FIG. 13 is a section through bi-metal tubing extruded from the sintered blank of FIG. 7.
FIG. 14 is a longitudinal sectional view through extruded tubing extruded from the compacted and sintered powdered metal blank of FIG. 8.
FIG. 15 is a similar view of bi-metal tubing extruded from the sintered blank of FIG. 9.

In order to form a bi-metal tube, as indicated generally at 24a in FIG. 13, having a relatively thin inner layer 2a of stainless steel, other alloy steel or the like, and a relatively thick outer layer 3a of iron, alloy or the like, the bi-metal blank 15a of FIG. 3 is formed in the apparatus shown in FIG. 1, comprising the relatively thin inner hollow cylinder 2b of stainless steel, other alloy steel or the like, surrounded by the relatively heavy cylindrical layer 3b of compacted powdered iron, alloy or the like, formed in the manner above described.

This blank is then sintered as above described producing the sintered blank 15a' shown in FIG. 7, with relatively thin inner layer 2b of stainless steel or the like and relatively heavy outer layer 3b' of sintered powdered iron, or the like, bonded thereto.

The blank 15a', while still hot, is then placed in the extrusion press shown in FIGS. 10 and 11, and the extruded bimetal tubing 24a is extruded therefrom, having the relatively thin inner layer 2a of stainless steel, or the like, and the relatively thick, dense homogeneous outer layer 3a of iron, or the like.

In order to form the extruded tube 24b of iron, alloy or the like, from powdered metal as shown in FIG. 14, the compacted hollow cylindrical blank 15b shown in FIG. 4 is formed in the apparatus of FIG. 1 of powdered iron, alloy, or the like.

The blank 15b of FIG. 4 is then removed from the container 4 and sintered to form the sintered blank 15b' shown in FIG. 8. This blank, while still hot, is then placed in the extrusion press shown in FIGS. 10 and 11 to extrude the dense, homogeneous tube 24b of iron, alloy, or the like, therefrom as shown in FIG. 14.

If it is desired to form bi-metal tubing 24c, as shown in FIG. 15, having the relatively thin outer layer 1c of stainless steel, other alloy steel, or the like, and the relatively thick inner layer 3c of iron, alloy or the like, the blank 15c shown in FIG. 5 is first formed in the apparatus of FIG. 1, comprising the outer cylinder 1c of stainless steel, or the like, and the relatively heavy inner cylinder 3c of compacted powdered iron, or the like.

The blank 15c is then removed from the apparatus of FIG. 1 and sintered, as shown in FIG. 9, forming the sintered blank 15c' having the relatively thin outer layer 1c' of stainless steel, or the like, and the relatively thick, dense, homogeneous inner layer 3c' of iron or the like.

The sintered blank 15c' of FIG. 9, while still hot, is then placed in the extrusion press shown in FIGS. 10 and 11 to extrude the bi-metal tubing 24c therefrom as shown in FIG. 15.

From the above it will be obvious that extruded tubing formed of, or containing compacted, dense powdered metal, may be economically and readily produced by the method above described.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. The method of making extruded tri-metal tubing having concentric layers of different metals, which consists in providing spaced concentric hollow thin-walled stainless steel cylinders, placing said cylinders in a press, placing powdered iron in the press between said stainless steel cylinders, compacting the powdered iron under pressure to form a dense, relatively thick-walled cylinder thereof in contact with said hollow stainless steel cylinders, sintering said dense hollow cylinder of compacted powdered iron to form a composite hollow cylinder of the two materials, and then extruding the hot composite cylinder to form extruded tri-metal tubing having relatively thin inner and outer layers of stainless steel and a relatively thick intermediate layer of iron.

2. The method of making extruded tri-metal tubing having concentric layers of different metals, which consists in providing spaced concentric hollow thin-walled stainless steel cylinders, placing said cylinders in a press, placing powdered iron in the press between said stainless steel cylinders, compacting the powdered iron under pressure of about 255,000 p.s.i. to form a dense, relatively thick-walled cylinder thereof in contact with said hollow stainless steel cylinders, sintering said dense hollow cylinder of compacted powdered iron at about 2000° F. to 2220° F. to form a composite hollow cylinder of the two materials, and then extruding the hot composite cylinder to form extruded tri-metal tubing having relatively thin inner and outer layers of stainless steel and a relatively thick intermediate layer of iron.

References Cited in the file of this patent

UNITED STATES PATENTS

| 305,023 | Shaw | Sept. 9, 1884 |
| 2,123,416 | Graham | July 12, 1938 |
| 2,148,040 | Schwarzhopf | Feb. 21, 1939 |
| 2,167,544 | De Bats et al. | July 25, 1939 |
| 2,299,192 | Tormyn | Oct. 20, 1942 |
| 2,372,202 | Hansel et al. | Mar. 27, 1945 |
| 2,725,265 | Daniels et al. | Nov. 29, 1955 |

FOREIGN PATENTS

| 483,005 | Canada | May 6, 1952 |
| 374,397 | Great Britain | June 9, 1932 |

OTHER REFERENCES

"Materials in Design Engineering," December 1958, vol. 48, No. 7, published by Reinhold Pub. Corp., New York, N.Y. (pp. 91-93 "Coextruded Parts Can Simplify Design," relied on). Copy in Div. 13, 207-10.3 publications.